United States Patent
Aladdin et al.

(10) Patent No.: US 9,998,570 B2
(45) Date of Patent: Jun. 12, 2018

(54) SYSTEM AND METHOD FOR CONCEALED CONNECTION MERGING THROUGH COORDINATED AND DYNAMIC VIRTUAL PROXY ALLOCATION

(71) Applicant: SWAG Technologies Sdn Bhd, Kuala Lumpur (MY)

(72) Inventors: Rami Aladdin, Kuala Lumpur (MY); Raphael Mannadiar, Kuala Lumpur (MY); Farhash Wafa Salvador, Kuala Lumpur (MY)

(73) Assignee: SWAG TECHNOLOGIES SDN BHD (MY)

( * ) Notice: Subject to any disclaimer, the term of this patent is extended or adjusted under 35 U.S.C. 154(b) by 0 days. days.

(21) Appl. No.: 15/315,800

(22) PCT Filed: Feb. 9, 2015

(86) PCT No.: PCT/MY2015/050004
§ 371 (c)(1),
(2) Date: Dec. 2, 2016

(87) PCT Pub. No.: WO2016/129985
PCT Pub. Date: Aug. 18, 2016

(65) Prior Publication Data
US 2017/0118313 A1  Apr. 27, 2017

(51) Int. Cl.
*G06F 15/16* (2006.01)
*H04L 29/06* (2006.01)
(Continued)

(52) U.S. Cl.
CPC .............. *H04L 69/14* (2013.01); *H04L 12/66* (2013.01); *H04L 41/069* (2013.01); *H04L 43/06* (2013.01);
(Continued)

(58) Field of Classification Search
CPC ..... H04L 69/14; H04L 67/42; H04L 41/0803; H04L 43/08; H04L 67/148; H04L 41/069;
(Continued)

(56) References Cited

U.S. PATENT DOCUMENTS 7,818,435 B1 * 10/2010 Jellinek ............. G06F 17/30902
709/203
7,979,508 B1 * 7/2011 Lamberton ....... H04L 29/08846
709/201

(Continued)

FOREIGN PATENT DOCUMENTS

JP       2009267876       11/2009
JP        201249643        3/2012

*Primary Examiner* — Lance Leonard Barry
(74) *Attorney, Agent, or Firm* — Renner Kenner Greive Bobak Taylor & Weber

(57) ABSTRACT

Specialized Internet gateway apparatuses provide Internet access to conventional network-enabled client devices through multiple disjoint segments of the Internet simultaneously by means of multiple Internet access devices and of a "connection-merging protocol". Virtual relay servers, which also implement the connection-merging protocol, act as proxies between the gateway apparatuses and the conventional network-enabled application servers the client devices connected to said gateway apparatuses wish to communicate with. A virtual resource allocation and information server aggregates status and routing information relevant to the gateway apparatuses, and dynamically adjusts the number, location and/or performance specifications of running virtual relay servers. As a result, a system and method for demand-driven, flexible-topology and intelligently-enabled communication between conventional network-enabled client devices and conventional network-enabled application servers concurrently over multiple conventional segments of the Internet is realized.

23 Claims, 5 Drawing Sheets

(51) Int. Cl.

| | |
|---|---|
| *H04L 12/66* | (2006.01) |
| *H04L 12/24* | (2006.01) |
| *H04L 29/08* | (2006.01) |
| *H04L 12/26* | (2006.01) |
| *H04W 72/04* | (2009.01) |
| *H04W 88/16* | (2009.01) |
| *H04W 88/18* | (2009.01) |

(52) U.S. Cl.
CPC ............ *H04L 43/08* (2013.01); *H04L 67/148* (2013.01); *H04L 67/42* (2013.01); *H04W 72/0453* (2013.01); *H04W 88/16* (2013.01); *H04W 88/182* (2013.01)

(58) Field of Classification Search
CPC .... H04L 12/66; H04L 43/06; H04W 72/0453; H04W 88/182; H04W 88/16
See application file for complete search history.

(56) References Cited

U.S. PATENT DOCUMENTS

| | | | |
|---|---|---|---|
| 2004/0260941 A1* | 12/2004 | Fearnley | H04L 63/08 |
| | | | 726/29 |
| 2008/0162637 A1* | 7/2008 | Adamczyk | H04L 51/043 |
| | | | 709/204 |
| 2011/0314144 A1* | 12/2011 | Goodman | G06Q 10/06 |
| | | | 709/224 |
| 2013/0111038 A1 | 5/2013 | Girard | |
| 2016/0219459 A1* | 7/2016 | Buddhikot | H04W 28/08 |

\* cited by examiner

SYSTEM AND METHOD FOR CONCEALED CONNECTION MERGING THROUGH COORDINATED AND DYNAMIC VIRTUAL PROXY ALLOCATION

FIELD OF THE INVENTION

The present invention relates generally to network communication systems, and more particularly to the coordination of dynamic pools of Internet proxies.

BACKGROUND

The bandwidth of mobile broadband has seen exponential improvements over the past decades. However, due to the infrastructure behind mobile broadband technologies (e.g., 2G GSM/GPRS/EDGE, 3G WCDMA/HSPA+/DC-HSPA+, 4G LTE/WiMAX, etc.), they have always been and continue to be far slower and far more expensive per-Gigabyte-of-usage than wired Internet access technologies (e.g., ADSL, VDSL, Cable, Fibre-optic). Mobile broadband technologies transport Internet traffic via a subset of the radio spectrum. Only relatively narrow portions of the entire radio spectrum have conventionally been reserved for consumer mobile broadband technologies, and obtaining the legal rights to transmit and receive on said portions of the radio spectrum has conventionally been an extremely expensive process. Furthermore, the disjoint portions of radio spectrum, called "frequency bands", reserved for consumer mobile broadband technologies (e.g., 800 Mhz band, 2100 Mhz band, 2600 Mhz band, etc.) are fractured into disjoint "frequency band channels". These factors contribute to the relatively low bandwidths and high prices of mobile broadband technologies in comparison to wired Internet access technologies. A very limiting factor to the bandwidth of any mobile broadband technology is the width of the conventionally narrow frequency band channel it operates on. Modern research into improving mobile broadband technologies revolves around altering mobile broadband infrastructures (and consequently any device intended to access said infrastructures) in order to support the utilization of multiple of the limited frequency band channels simultaneously by a single device, and improving the efficiency of data transport and signal encoding techniques. Both approaches are conventionally extremely costly and lengthy to deploy given that software and/or hardware modifications need to be physically carried out at every single cellular base station. Moreover, only the latest of consumer devices can conventionally make use of the latest mobile broadband technologies. Mobile broadband technologies do hold some advantages over wired Internet access technologies though: they are conventionally already available and/or less costly to deploy in rural areas, in developing countries, in moving vehicles, etc.; all contexts where wired Internet access technologies are often either challengingly expensive or downright impossible to deploy and/or maintain.

Merging the bandwidths of multiple network connections has been a topic of academic and commercial research for decades. Merged network connections can offer higher-bandwidth and increased robustness to individual connection failures. Numerous software and hardware, academic and commercial "connection-merging solutions" have been invented which offer varying levels of improved bandwidth and/or reliability, and varying levels of support for transporting existing network protocols (e.g., TCP, UDP, ICMP, etc.). However, a common and seemingly unavoidable limitation across all solutions is that end-points (e.g., communicating client devices and application servers) must undergo software and/or hardware upgrades to support the connection-merging solutions. Some efforts have proposed solutions where portions of the network infrastructure between end-points undergo software and/or hardware upgrades to enable the end-points to benefit from merged network connections without being altered themselves. These solutions are conventionally not portable, are limited in scope and flexibility, and do not scale to real world scenarios where client devices and application servers may be geographically scattered and exist in arbitrarily high numbers.

So-called MiFi devices and mobile broadband USB adapters (e.g., 3G/4G USB adapters) bring the ubiquitous and portable properties of mobile broadband technologies to non-mobile-broadband-enabled devices (e.g., laptop computers, desktop computers, tablets), enabling said devices to access the Internet over mobile broadband infrastructures via a peripheral device. While numerous MiFi devices and mobile broadband USB adapters exist, they conventionally do not support or include any form of Internet connection merging.

SUMMARY OF INVENTION

The invention is a system and method for demand-driven, flexible-topology and intelligently-enabled communication between conventional network-enabled client devices and conventional network-enabled application servers over multiple conventional segments of the Internet concurrently; the system comprising:

one or more Internet gateway apparatuses, each of which provides Internet access to one or more of the conventional network-enabled client devices through multiple Internet connections simultaneously by means of multiple Internet access devices and of a "connection-merging protocol";

one or more virtual relay servers, each of which also implements the connection-merging protocol, and acts as a proxy between one or more of the gateway apparatuses and one or more of the conventional network-enabled application servers the client devices connected to said gateway apparatuses wish to communicate with; and a virtual resource allocation and information server that aggregates status and routing information relevant to the gateway apparatuses, and that dynamically adjusts the number, location and/or performance specifications of the virtual relay servers.

The key features of the invention are:

that the relay servers, each of which effectively enables one or more of the gateway apparatuses to each simultaneously utilize multiple Internet connections through the shared communication-merging protocol, are virtual and geographically scattered, and that they are dynamically launched, configured and terminated according to usage and performance metrics as well as the locations of said gateway apparatuses, thereby forming a dynamically adjusted network topology;

that the multiple Internet access devices of each of the gateway apparatuses are explicitly configured and programmed to select maximally disjoint segments of the Internet to exchange network data with the relay servers, such as to minimize competition for network resources;

that neither the client devices, the application servers, nor the Internet infrastructure that connects them need to be modified or configured in any way for said clients and servers to benefit from the added reliability and bandwidth yielded by the concurrent utilization of multiple, possibly partially or entirely disjoint, segments of the Internet; and that the gateway apparatuses and virtual relay servers can each transport network data of any network protocol (e.g., TCP, UDP, ICMP, etc.) over multiple Internet connections simultaneously by wrapping said data within the shared connection-merging protocol.

In the preferred embodiment of the invention, the gateway apparatuses are portable devices and their multiple Internet access devices are mobile broadband access devices configured and programmed to use disjoint mobile broadband infrastructure segments (i.e., disjoint frequency band channels) whenever possible. Thus, in its preferred embodiment, the invention provides a portable means for conventional client devices to benefit from the added reliability and bandwidth yielded by the concurrent utilization of multiple disjoint segments of mobile broadband infrastructures when accessing the Internet.

The present invention consists of features and a combination of parts hereinafter fully described and illustrated in the accompanying drawings, it being understood that various changes in the details may be made without departing from the scope of the invention or sacrificing any of the advantages of the present invention.

BRIEF DESCRIPTION OF THE DRAWINGS

To further clarify various aspects of some embodiments of the present invention, a more particular description of the invention will be rendered by references to specific embodiments thereof, which are illustrated in the appended drawings. It is appreciated that these drawings depict only typical embodiments of the invention and are therefore not to be considered limiting of its scope. The invention will be described and explained with additional specificity and detail through the accompanying drawings.

DETAILED DESCRIPTION

Figure 1:
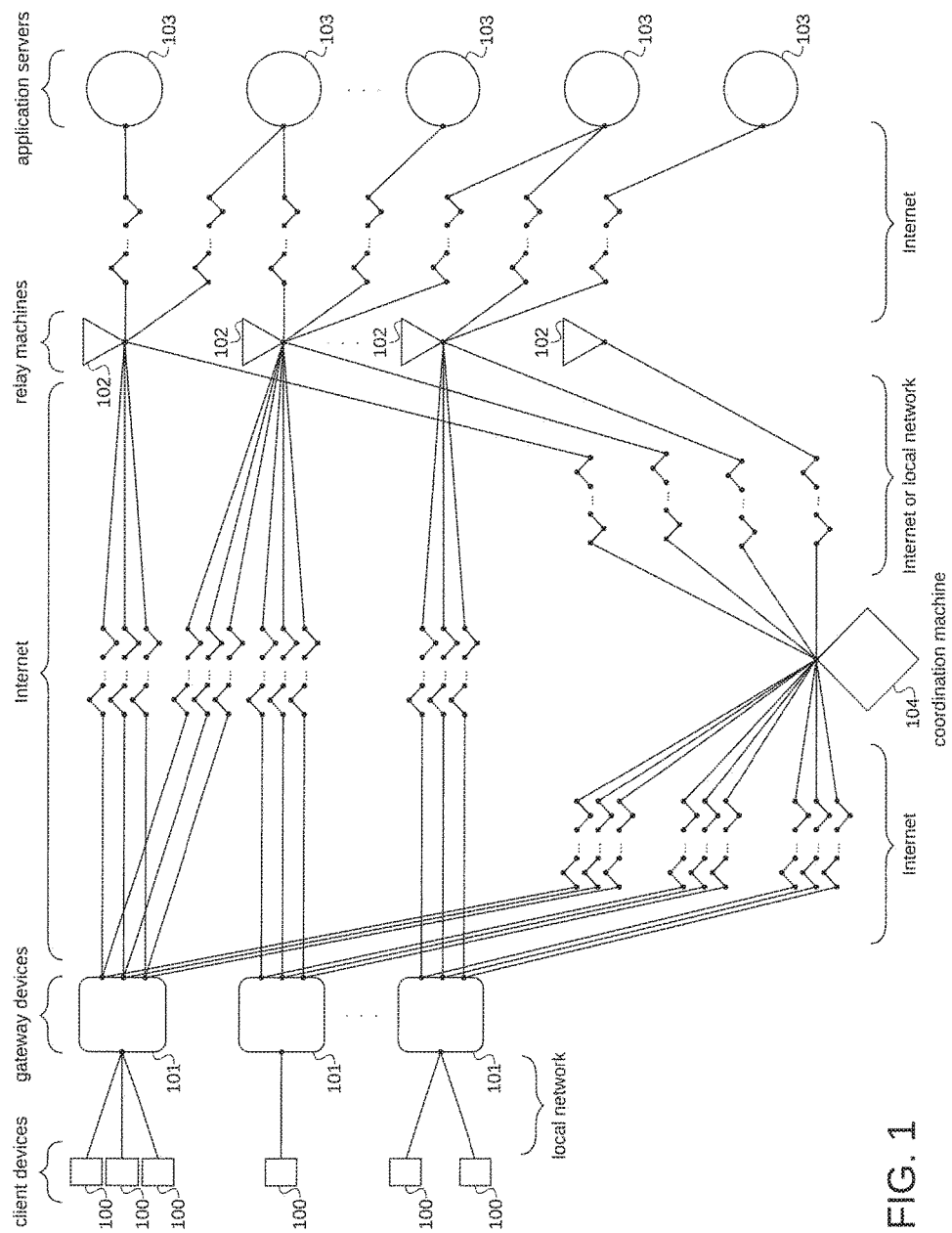
FIG. 1 depicts all the elements of the disclosure's system at a high-level, as well as their network topology in the invention's preferred embodiment.

The invention in its preferred embodiment is depicted in FIG. 1. Client devices 100 and application servers 103 communicate with each other through one or more gateway devices 101 and one or more relay machines 102, which in turn communicate with each other over multiple conventional segments of the Internet concurrently. Further, the gateway devices 101 and the relay machines 102 exchange network topology information and usage and performance metrics with a coordination machine 104. Further, the coordination machine 104 dynamically launches, configures and terminates relay machines 102 and dynamically assigns one of the relay machines 102 to each of the gateway devices 101 according to usage and performance metrics.

Each of the client devices 100 is an arbitrary, unmodified, network-enabled user equipment (e.g., a mobile phone, a tablet, a phablet, a laptop computer, a desktop computer, a GPS device, a smart appliance, etc.) that accesses the Internet through one of the gateway devices 101, which it connects to directly in a wireless manner.

Figure 2:
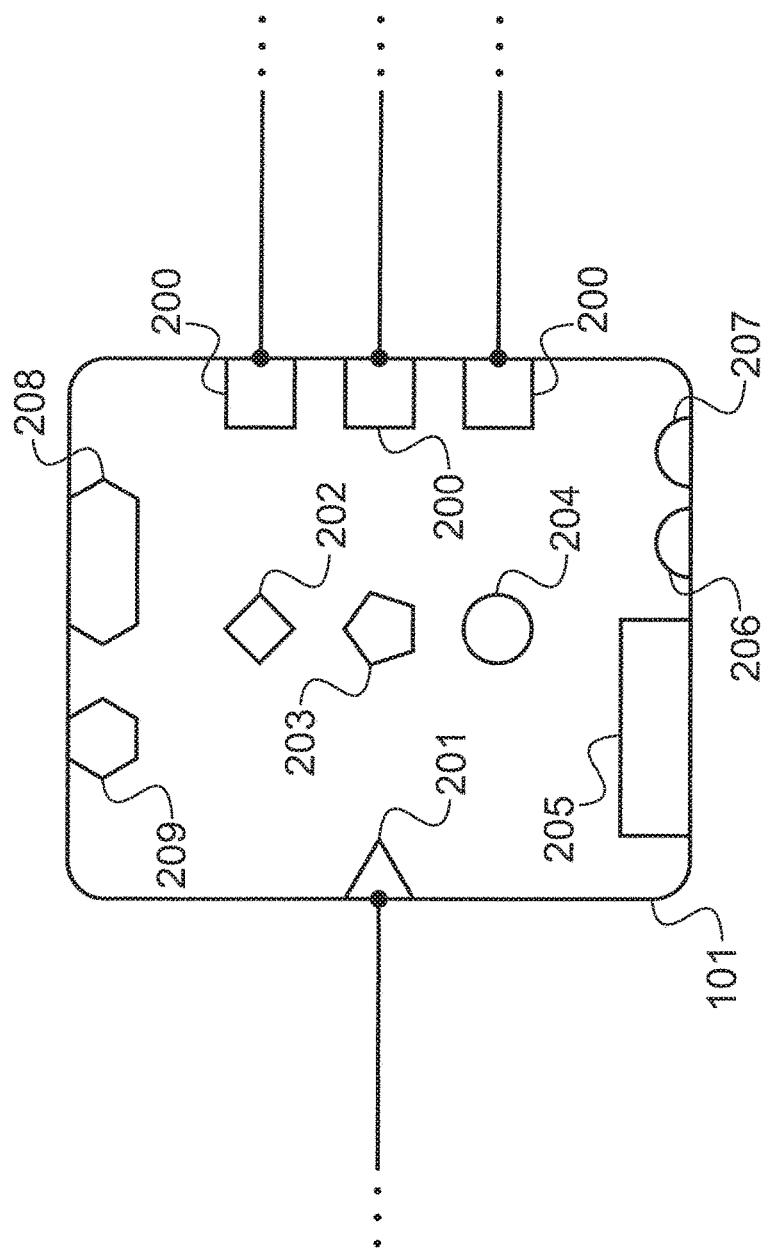
FIG. 2 zooms into an exemplary gateway device 101, focusing on its hardware components in the invention's preferred embodiment.

Each of the gateway devices 101, as depicted in detail in FIG. 2, comprises two or more mobile broadband (e.g., 2G GSM/GPRS/EDGE, 3G WCDMA/HSPA+/DC-HSPA+, 4G LTE/WiMAX, etc.) access devices 200 (e.g., SIM card-based modems), and is able to connect to the Internet as well as transmit and receive data to and from one or more of the application servers 103 through the two or more access devices' 200 Internet connections simultaneously. Further, the access devices 200 are configured and programmed to utilize distinct frequency band channels whenever possible such as to maximally reduce the likelihood of the access devices 200 competing for the same network resources (e.g., network capacity and bandwidth of a single frequency band channel) as well as to minimize the likelihood of interference between the access devices 200.

Figure 3:
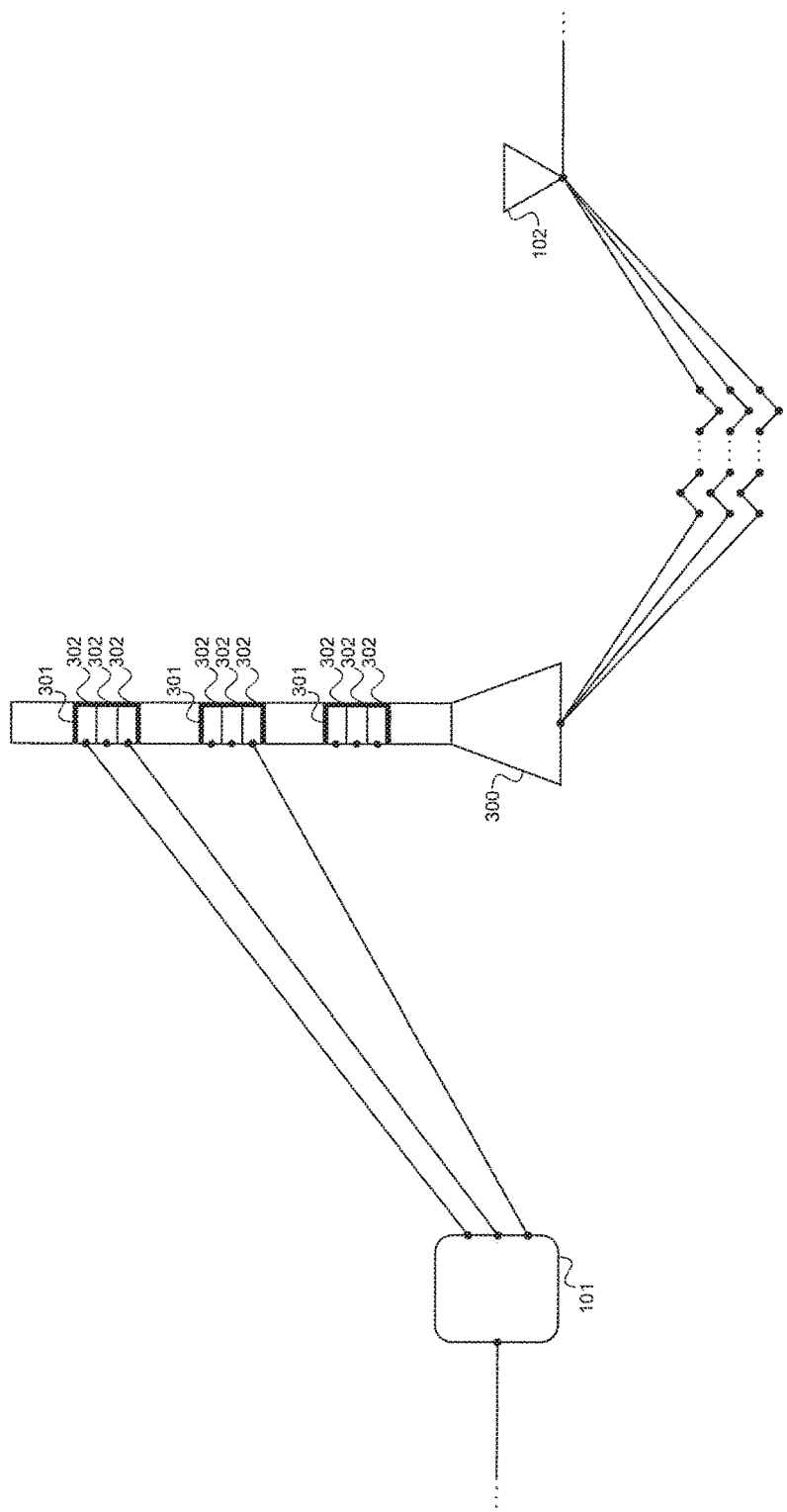
FIG. 3 zooms into the mobile broadband component of the Internet infrastructure that connects an exemplary gateway device 101 and an exemplary relay machine 102 in the invention's preferred embodiment.

This is depicted in FIG. 3 where an exemplary gateway device's 101 mobile broadband access devices 200 explicitly connect to distinct frequency band channels 302 of possibly distinct frequency bands 301 on a cellular base station 300. In this configuration, each of the mobile broadband access devices 200 can potentially access the entire bandwidth of the frequency band channel 302 it connects to and the total bandwidth accessible by all of the mobile broadband access devices 200 equals the sum of the available bandwidths of each of the connected-to frequency band channels 302, and is thus larger than the available bandwidth of any individual connected-to frequency band channel 302. Conversely, and illustrative of the aforementioned competition for network resources, if two or more of the mobile broadband access devices 200 were to connect to the same frequency band channel 302, the total bandwidth accessible by said mobile broadband access devices 200 would be at most as large as the available bandwidth of said individual frequency band channel 302.

Each of the gateway devices' 101 mobile broadband access devices 200 may further utilize different mobile broadband technologies (e.g., 2G GSM/GPRS/EDGE, 3G WCDMA/HSPA+/DC-HSPA+, 4G LTE/WiMAX, etc.). This is especially useful to further reduce the possibility of competition for network resources, to further reduce the likelihood of interference between the access devices 200, to increase the reliability of the gateway devices' 101 overall connectivity by utilizing maximally disjoint mobile broadband infrastructures, and to dynamically adapt to the varying levels of coverage and deployment of the numerous existing mobile broadband technologies.

In one realization of the preferred embodiment of the invention, the gateway devices' 101 mobile broadband access devices 200 are SIM card-based modems. In this realization, the mobile broadband access devices 200 can be forced to utilize disjoint frequency band channels 302 by inserting SIM cards from different mobile operators into each of the modems, and/or by inserting SIM cards restricted to different mobile broadband technologies (e.g., 2G GSM/GPRS/EDGE, 3G WCDMA/HSPA+/DC-HSPA+, 4G LTE/WiMAX, etc.) into each of the modems, and/or by explicitly programming the modems to connect to disjoint frequency band channels 302, regardless of their SIM cards.

Each of the gateway devices 101 further comprises a WiFi adapter 201, and provides Internet connectivity to one or more of the client devices 100 in a wireless manner through 2.4 Ghz and/or 5 Ghz WiFi networks emitted by said WiFi adapter 201.

Each of the gateway devices 101 further comprises a processing unit 202, a memory unit 203 and a storage unit 204, to run and store computer programs.

Each of the gateway devices 101 further runs computer programs that intercept all Internet traffic originating from connected client devices 100 and intended for one or more of the application servers 103, irrespective of said traffic's network protocol (e.g., TCP, UDP, ICMP, etc.), and proxy said traffic through one or more of the relay machines 102, selectively using the Internet connection of one of the gateway device's 101 mobile broadband access devices 200 for each network data unit (e.g., network packet).

- The Internet connection to use is selected dynamically based on one or more properties (e.g., latency, available bandwidth, reliability, cost) of each of the connections. This selection mechanism, as well as the associated transmission, reception, buffering, validation and synchronization facilities form a "connection-merging protocol". Numerous such protocols exist and may be utilized. The merger of a gateway device's 101 multiple Internet connections is henceforth referred to as its "macro connection"; the macro connection's upstream and downstream bandwidths are respectively equal to the sum of the upstream bandwidths and the sum of the downstream bandwidths of each of said gateway device's 101 Internet connections.
- The relay machine 102 each of the gateway devices 101 should proxy Internet traffic originating from connected client devices 100 through is dictated by network topology information periodically provided by the coordination machine 104. The coordination machine 104 provides each of the gateway devices 101 with the Internet Protocol (IP) address of the geographically nearest relay machine 102 with the most available bandwidth. Each of the gateway devices 101 thus normally proxies Internet traffic originating from connected client devices 100 through a single relay machine 102. However, the coordination machine 104 may decide, for resource management or maintenance purposes, that one or more of the gateway devices 101 should "migrate" to a different relay machine 102, in which case it will instruct said gateway devices 101 to proxy all future Internet traffic originating from connected client devices 100 through a different relay machine 102. Thus, and until any pending network exchanges already proxied through its original relay machine 102 are complete, one or more of the gateway devices 101 may simultaneously proxy Internet traffic originating from connected client devices 100 through multiple relay machines 102.
- Upon receiving network data from one of the client devices 100 (via one of the gateway devices 101 and one of the relay machines 102), one of the application servers 103 may choose to transmit a network response to that client. Said network response from said application server 103 intended for said client device 100 is first transmitted to said relay machine 102, and then from said relay machine 102 to said gateway device 101 along one or more of the Internet connections between said gateway device 101 and said relay machine 102. The Internet connections to use for each network data unit (e.g., network packet) are selected dynamically based on one or more properties (e.g., latency, available bandwidth, reliability, cost) of each of the connections.

Each of the gateway devices 101 further runs a computer program that queries the coordination machine 104 to know which relay machine 102 it should proxy Internet traffic originating from connected client devices 100 through. This computer program runs after one of the gateway devices 101 completes its boot process, and after any loss of Internet connectivity.

Each of the gateway devices 101 further runs a computer program that periodically monitors the latency, bandwidth and reliability of each of its Internet connections. Whenever one of its connection is deemed of unacceptably poor quality, said computer program terminates said connection and schedules its relaunch at a later time.

Each of the gateway devices 101 further runs a computer program that provides secure remote access facilities to log in to said gateway device 101. Said facilities enable remote maintenance, technical support, software updates, device locating, disabling in the event of loss and/or theft, and more.

Each of the gateway devices 101 further comprises a feedback display 205 and two physical interfaces 206-207. The feedback display 205 indicates status information on said gateway device's 101 macro connection's reliability, bandwidth and/or latency, and on the overall signal strengths of each of said gateway device's 101 Internet connections. The feedback display 205 can take several forms including but not limited to an LCD screen, an e-ink screen and/or one or more LEDs. The first physical interface 206 re-computes the status information and refreshes the feedback display 205. The second physical interface 207 is said gateway device's 101 on/off switch.

Each of the gateway devices 101 further runs a computer program that provides a network interface for connected client devices 100 to remotely access and refresh the status information displayed by said gateway device's 101 feedback display 205 by connecting to a predetermined network port on said gateway device 101 and/or through a dedicated computer program that may run on one or more of the client devices 100.

Each of the gateway devices 101 further comprises an internal, rechargeable battery 208, and a power input port 209 to recharge said battery (e.g., a micro-USB port). Thus, the gateway devices 101 may be portable devices.

Each of the relay machines 102 is a virtual machine operating on the Internet, and comprises a virtual processing unit, a virtual memory unit and a virtual storage unit, to run and store computer programs.

- There are one or more relay machines 102 geographically hosted around the world. The coordination machine 104 controls their numbers and geographic locations as a function of bandwidth demand on per-region, per-country or per-city bases according to the availability of virtual machine hosting services, and in such a way as to maximally reduce the number of network hops between the gateway devices 101 and the relay machines 102 said gateway devices proxy Internet traffic originating from connected client devices 100 through, to reduce overall latency and increase overall reliability.

Each of the relay machines 102 acts as a proxy between one or more of the client devices 100 and the Internet, and hides from the application servers 103 the fact that said client devices 100, via the gateway devices 101, simultaneously utilize multiple Internet connections. This is required due to the fact that conventional application servers expect a given client device to have a single Internet connection or IP address.

Further, each of the relay machines 102 implements the connection-merging protocol used by the gateway devices 101.

Further, for the client devices 100 connected to each of the gateway devices 101 to be able to fully utilize the bandwidth of said gateway device's 101 macro connection, and to account for the fact that the relay machines' 102 bandwidths are used to both receive the gateway devices' 101 network traffic and to retransmit it to the application servers 103, or conversely, to both receive network traffic from the application servers 103 and to retransmit it to the gateway devices 101, the available bandwidth between each of the relay machines 102 and the Internet must be at least twice as high as the summed bandwidths of the macro connections of the gateway devices 101 proxying Internet traffic originating from connected client devices 100 through said relay machine 102.

More specifically, both the available upstream and downstream bandwidths between each of the relay machines 102 and the Internet must each be at least as high as the summed downstream and upstream bandwidths of the macro connections of the gateway devices 101 proxying Internet traffic originating from connected client devices 100 through said relay machine 102.

Each of the relay machines 102 further runs a computer program that periodically measures the network and computational load of the relay machine 102, and reports the measurements to the coordination machine 104.

Each of the relay machines 102 further runs an additional computer program that logs the Internet traffic the relay machine relays when the governing laws of the country in which relevant client devices 100, gateway devices 101 and said relay machine 102 are located require that Internet traffic be traceable to its originating client device.

Each of the application servers 103 is an arbitrary, unmodified, network-enabled machine connected to the Internet (e.g., a machine hosting a website such as Google.com, Facebook.com, etc.). Each of the relay machines 102 accesses the application servers 103 through its Internet connection.

The coordination machine 104 is a virtual machine operating on the Internet, and comprises a virtual processing unit, a virtual memory unit and a virtual storage unit, to run and store computer programs. The coordination machine 104 aggregates usage and performance metrics sent to it by the relay machines 102, launches, configures and terminates relay machines 102 according to said metrics, and instructs each of the gateway devices 101 as to which of the relay machines 102 to proxy Internet traffic originating from connected client devices 100 through.

The coordination machine 104 receives queries by newly booted up and (re-)connected gateway devices 101, asking to be assigned a relay machine 102 to proxy Internet traffic originating from connected client devices 100 through. The coordination machine 104 instructs said gateway devices 101 to proxy Internet traffic originating from connected client devices 100 through the geographically nearest of the relay machines 102, with the most available bandwidth.

Further, when geographically colocated relay machines 102 are under-utilized to a degree where reducing their number would not cause the remaining relay machines 102 to become over-utilized, the coordination machine 104 initiates the termination of one or more of the relay machines 102. The termination process begins with the coordination machine 104 instructing the gateway devices 101 currently proxying Internet traffic originating from connected client devices 100 through the one or more to-be-terminated relay machines 102 to proxy all future Internet traffic originating from connected client devices 100 through one of the other relay machines 102. Once all said gateway devices 101 have completely ceased to proxy any Internet traffic originating from connected client devices 100 through one of the to-be-terminated relay machines 102, the coordination machine 104 shuts down said relay machine 102. At no point after the termination process of one of the relay machines 102 has begun will the coordination machine 104 instruct any of the gateway devices 101 to proxy the Internet traffic originating from connected client devices 100 through said relay machine 102. The coordination machine 104 ensures that the gateway devices 101 are instructed to migrate to different relay machines 102 such that post-migration, the summed bandwidths of the macro connections of the gateway devices 101 assigned to any of the remaining relay machines 102 is as uniform as possible across the remaining relay machines 102. The coordination machine 104 further ensures that there is always at least one relay machine 102 for any given geographic area where one or more of the gateway devices 101 operate, which may be a region, a country or a city depending on the availability of virtual machine hosting services in said geographic area.

Further, as one or more geographically colocated relay machines 102 become over-utilized, the coordination machine 104 launches one or more new geographically colocated relay machines 102 to alleviate the network and computational load borne by the currently operating relay machines 102. Once one of the new relay machines 102 has completed its boot up process, the coordination machine 104 instructs a subset of the gateway devices 101 to migrate to the new relay machine 102 such that post-migration, the summed bandwidths of the macro connections of the gateway devices 101 assigned to each of the (old and new) relay machines 102 is as uniform as possible.

As of this writing, there exists a number of "connection-merging protocols" that enable communication between specialized network-enabled client devices and specialized network-enabled application servers over multiple specialized or conventional segments of the Internet concurrently. Conceptually, connection-merging protocols can "merge" several Internet connections into a "macro connection". The purpose of such connection merging is to combine the bandwidth and/or reliability of the individual connections, or to otherwise improve upon one or more metrics of the individual connections. A commonly recurring means of realizing this purpose is to prioritize those individual connections that provide such properties as higher bandwidths, higher reliability, lower operating costs, lower latencies, etc. These properties can be observed dynamically to adjust the way network traffic is distributed among the individual connections dynamically. Further, connection-merging protocols that operate in contexts where individual connection latencies are heterogeneous may temporarily store incoming and outgoing network data in buffers to synchronize the data that is sent and received on each individual connection, where said buffers are sized according to one or more properties of said individual connections. An alternate means of operating in contexts where individual connection latencies are heterogeneous is to artificially increase the latency of lower-latency connections in order for all connections to have more uniform latencies. Although certain connection-merging protocols can operate over conventional segments of the Internet which are oblivious to said connection-merging protocols, a limitation of all existing connection-merging protocols as of this writing is that the communicating end-point network devices (i.e., client devices and application servers) are required to implement the connection-merging protocol. A core function of the system formed by the gateway devices 101, the relay machines 102 and the coordination machine 104 is to overcome this limitation in a dynamically-calibrated manner and enable any conventional network-enabled client device (i.e., any of the client devices 100) and any conventional network-enabled application server (i.e., any of the application servers 103) to communicate while benefiting from the enhanced properties of the macro connection over any of the individual connections it merges, without the need for said client devices, said application servers, or the Internet infrastructure between them to be modified to implement the connection-merging protocol.

Figure 4:
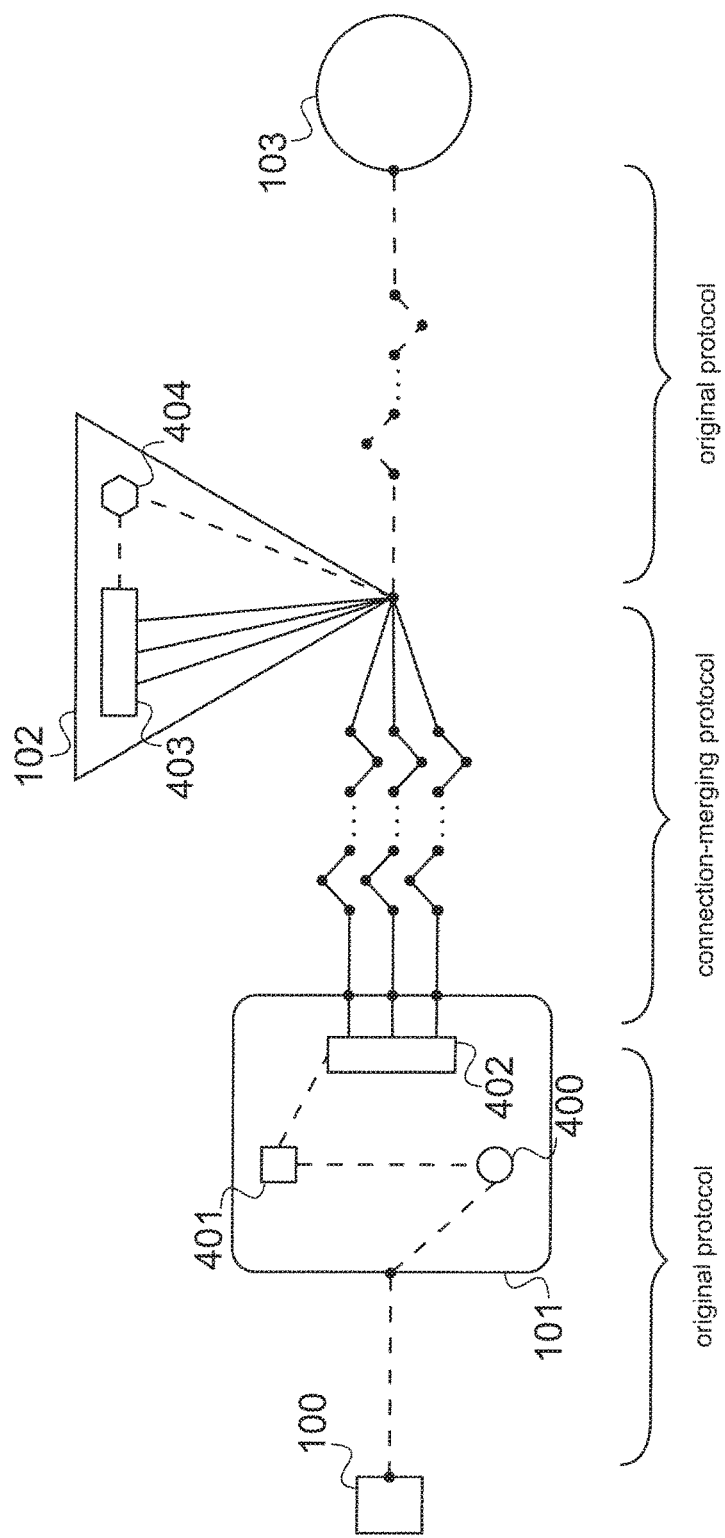
FIG. 4 zooms into the software elements encountered by network data flowing between an exemplary client device 100 and an exemplary application server 103 in the invention's preferred embodiment.

The flow of network data between an exemplary client device 100 and an exemplary application server 103 in the preferred embodiment of the invention is depicted in FIG. 4.

The client device 100 makes a conventional network request directed at the application server 103 using an arbitrary network protocol (e.g., TCP, UDP, ICMP, etc.). As the client device's 100 Internet gateway, one of the gateway devices 101 must route the client device's 100 network request to the Internet. In order for network requests originating from the client device 100 to be transmitted by the gateway device's 101 multiple Internet connections concurrently, the requests must undergo a processing, carried out by three computer programs 400-401-402 running on the gateway device 101.

The first computer program 400 intercepts the network request and redirects it (i.e., changes its destination) to a local port on the gateway device 101 on which the second computer program 401 is listening.

The second computer program 401 further alters the network request such that the gateway device's 101 assigned relay machine 102 may act as a proxy for the client device 100, and forwards it to said relay machine 102 for said relay machine 102 to complete the network request and return the application server's 103 network response.

As the network request exits the gateway device 101, the third computer program 402 intercepts it and modifies it to support the connection-merging protocol such that the gateway device's 101 multiple Internet connections can be utilized concurrently to transmit the network request. The third computer program 402 then chooses how much of each of the gateway device's 101 Internet connections to use to transmit the network request to the relay machine 102 based on one or more properties (e.g., latency, available bandwidth, reliability, cost) of each of the connections, and transmits the network request accordingly.

The relay machine 102 receives the network request through its single, Internet-facing network interface, but from multiple source-IP addresses. Any network requests received by the relay machine 102 from the gateway device 101 are handled by two computer programs 403-404. The first computer program 403, analogously to the third computer program 402 running on the gateway device 101, synchronizes and reassembles partial network requests received over the multiple Internet connections, and recreates the original network request with its original network protocol (e.g., TCP, UDP, ICMP, etc.) so that it can be processed by the application server 103 (that does not implement the connection-merging protocol). Then, the first computer program 403 hands off the request to the second computer program 404.

The second computer program 404 operates in tandem with the second computer program 401 running on the gateway device 101. Together, they carry out the proxying of the network request. The second computer program 404 transmits the network request to the application server 103 over the relay machine's 102 single Internet connection on its single network interface.

The application server 103 receives the network request, processes it as it would any conventional request, and transmits a network response back to the relay machine 102 over the single Internet connection that connects the relay machine's 102 single network interface to the application server 103.

The second computer program 404 running on the relay machine 102 receives the network response from the application server 103, recognizes that the network response is intended for the client device 100, and forwards it to the gateway device 101 to return the application server's 103 network response to the client device 100.

As the network response exits the relay machine 102, the first computer program 403 intercepts it and modifies it to support the connection-merging protocol such that the gateway device's 101 multiple Internet connections can be utilized concurrently to receive the network response. The first computer program 403 then chooses how much of each of the gateway device's 101 Internet connections to use to transmit the network response to the gateway device 101 based on one or more properties (e.g., latency, available bandwidth, reliability, cost) of each of the connections, and transmits the network response accordingly.

The third computer program 402 running on the gateway device 101 receives the network response over the gateway device's 101 multiple Internet connections. It synchronizes and reassembles partial network responses received over each of the Internet connections, and recreates the original network response with its original network protocol (e.g., TCP, UDP, ICMP, etc.) so that it can be processed by the client device 100 (that does not implement the connection-merging protocol). Then, the third computer program 402 hands off the network response to the second computer program 401.

The second computer program 401 recognizes that the network response is intended for the client device 100 and hands it off to the first computer program 400.

The first computer program 400 transmits the network response to the client device 100, thereby completing the network request and response process between the client device 100 and the application server 103.

In realistic embodiments and as depicted in FIG. 1, there may be multiple client devices 100 connected to a single gateway device 101, multiple gateway devices 101 each proxying traffic originating from connected client devices 100 through one or more relay machines 102, multiple relay machines 102 each exchanging network data with one or more gateway devices 101 and one or more application servers 103, and multiple application servers 103 exchanging network data with one or more relay machines 102. The described flow of network data between the client devices 100 and the application servers 103 extends to these more complex network topologies without alteration.

In another embodiment of the invention, the client devices 100 do not connect directly to the gateway devices 101 but rather there is one or more conventional network routing apparatuses (e.g., network router, network switch, WiFi range extender) between the client devices 100 and the gateway devices 101. Such an embodiment is conceivable in cases where the gateway devices 101 are intended to provide Internet connectivity to client devices 100 that are beyond the range of the WiFi emitted by said gateway devices' 101 WiFi adapters 201. The invention is not restricted by the network topology between the client devices 100 and the gateway devices 101, namely, the invention is not restricted by whether Internet connectivity is provided by the gateway devices 101 to the client devices 100 in a direct or in a routed manner.

In another embodiment of the invention, the gateway devices' 101 mobile broadband access devices 200 may have one or more external antennas to improve signal reception. Said antennas may be detachable and/or motorized. The invention is not restricted to any past, present or future mobile broadband signal acquisition and/or enhancement technologies used by the gateway devices' 101 mobile broadband access devices 200.

In another embodiment of the invention, the gateway devices' 101 mobile broadband access devices 200 may be modular and it may be possible to add and/or remove one or more of the gateway devices' mobile broadband access devices 200. The invention is not restricted to the physical realization of the gateway devices 101.

In another embodiment of the invention, one or more of the gateway devices' 101 mobile broadband access devices 200 may not rely on conventional SIM-cards. In another embodiment of the invention, the gateway devices' 101 Internet connections may not utilize mobile broadband infrastructure, and instead be based on non-mobile broadband Internet access technology (e.g., ADSL, VDSL, Cable, Fibre-optic, Satellite). In yet another embodiment, the gateway devices' 101 Internet connections may be based on heterogeneous Internet access technologies (e.g., one or more mobile broadband Internet connections and one or more ADSL Internet connections). The invention is not restricted to any past, present or future Internet access technologies or combination thereof used by the gateway devices' 101 Internet connection access devices.

In another embodiment of the invention, the gateway devices 101 may comprise Ethernet ports in replacement or alongside their WiFi adapters 201. Said gateway devices 101 would provide connectivity to the client devices 100 in a wired manner via said Ethernet ports. In another embodiment, the gateway devices 101 may provide additional means of wireless connectivity to the client devices 100 (e.g., Bluetooth, infrared, LiFi) in replacement or alongside their WiFi adapters 201. The invention is not restricted to any past, present or future means by which the gateway devices 101 provide wired and/or wireless Internet connectivity to the client devices 100.

In another embodiment of the invention, the gateway devices 101 may not comprise batteries 208, rechargeable or otherwise, and may require constant, external electrical input to their power input ports 209 to function. In this embodiment, the gateway devices 101 may not be portable devices. The invention is not restricted by the portability or lack thereof of the gateway devices 101.

In another embodiment of the invention, the relay machines 102 may be physical machines rather than virtual machines. The invention is not restricted by the physical infrastructure that realizes the relay machines 102.

In another embodiment of the invention, the coordination machine 104 may dynamically scale the performance specifications of the relay machines 102 rather than merely adjust their numbers. The invention is not restricted by the means by which the processing and network resources of the relay machines 102 are managed by the coordination machine 104.

In another embodiment of the invention, the coordination machine 104 may be a physical machine rather than a virtual machine. The invention is not restricted by the physical infrastructure that realizes the coordination machine 104.

Figure 5:
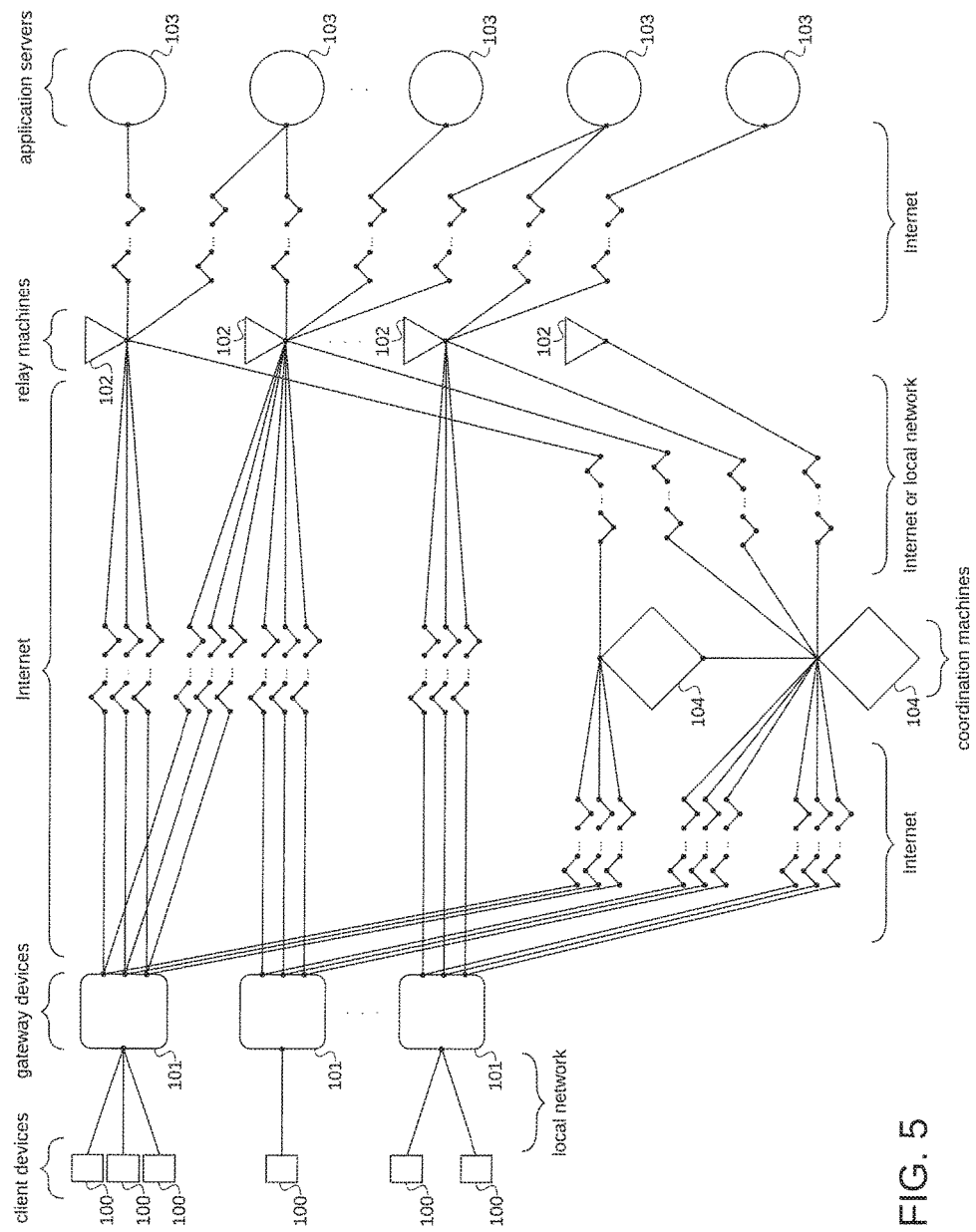
FIG. 5 depicts all of the elements of the disclosure's system at a high level, as well as their network topology in an alternate embodiment of the invention, where the functions of the coordination machine 104 are distributed onto at least two coordination machines 104.

In another embodiment of the invention and as depicted in FIG. 5, the functions of the coordination machine 104 may be distributed onto multiple coordination machines 104 to reduce the network and computational load borne by a single coordination machine 104, to reduce the geographic distance from the gateway devices 101 and the relay machines 102 to their coordination machine 104, and/or to increase the overall system's robustness to coordination machine 104 failures. The invention is not restricted to any set number of coordination machine 104 instances.

In another embodiment of the invention, the functions of the coordination machine 104 may be implemented as a peer-to-peer, decentralized, possibly distributed computer program running on one or more of the relay machines 102, to increase the overall system's robustness to coordination machine 104 failures and/or performance limitations. The invention is not restricted by the software architecture of the computer programs that carry out the functions of the coordination machine 104.

In another embodiment of the invention, the client devices 100 could be explicitly configured or programmed to redirect their Internet traffic to one of the relay machines 102. This would remove the need for the first two computer programs 400-401 running on the gateway devices 101 and for the second computer program 404 running on the relay machines 102 thereby considerably reducing the gateway devices' 101 and the relay machines' 102 respective processing loads. The invention is applicable to conventional client devices 100 as well as to client devices 100 configured and/or programmed to take on the proxying functions of the gateway devices' 101 functions.

In another embodiment, the gateway devices 101 could be physically and/or functionally enhanced to provide functionality attributed to the client devices 100. In one realization of this embodiment, the gateway devices 101, while retaining their multiple Internet access devices 200, proxying and connection-merging functions, additionally serve as mobile phones. Each of said mobile phones would comprise, alongside its conventional components (e.g., processing unit, cameras, touch screen, etc.), two or more Internet access devices, would implement the connection merging protocol, and would be programmed to proxy its Internet traffic as well as that of any of the client devices 100 connected to said mobile phone through one of the relay machines 102. The invention is applicable to gateway devices 101 physically or functionally enhanced to provide arbitrary functions attributed to client devices 100 (e.g., a mobile phone, a tablet, a phablet, a laptop computer, a desktop computer, a GPS device, a smart appliance, etc.).

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes, which come within the meaning and range of equivalency of the claims, are to be embraced within their scope.

The invention claimed is:

1. A system for demand-driven, flexible-topology and intelligently-enabled communication between one or more network-enabled client devices and one or more network-enabled application servers over multiple segments of the Internet concurrently; the system comprising:
    one or more gateway devices, wherein the gateway devices each comprise at least two simultaneously-operating Internet access devices and enable each of the client devices to transmit and receive data to and from the application servers through at least two Internet connections simultaneously by means of connection-selection and network data transmission, reception, buffering, validation, and synchronization facilities being referred to as a connection-merging protocol, the merger of a gateway device's multiple Internet connections being referred to as a macro connection;
    one or more virtual relay machines, wherein the relay machines each implement the connection-merging protocol, and act as proxies between the client devices and the application servers; and
    one virtual coordination machine operating on the Internet, wherein the virtual coordination machine aggregates system status metrics, and launches, configures and terminates relay machines according to said metrics, and instructs the gateway devices as to which of the relay machines to proxy Internet traffic originating from the client devices through.

2. The system of claim 1, wherein the client devices are programmed to use at least one of the relay machines as a proxy.

3. The system of claim 1, wherein the gateway devices are physically and/or functionally enhanced to provide functionality attributed to the client devices.

4. The system of claim 1, wherein the Internet access devices are mobile broadband access devices.

5. The system of claim 1, wherein at least one of the Internet access devices utilizes a non-mobile broadband Internet access technology.

6. The system of claim 4, wherein the mobile broadband access devices are programmed to utilize distinct frequency band channels whenever possible.

7. The system of claim 1, wherein the gateway devices provide direct and/or routed, wired and/or wireless Internet connectivity to the client devices.

8. The system of claim 1, wherein the gateway devices are portable and battery powered.

9. The system of claim 1, wherein the available upstream and downstream bandwidths between each of the relay machines and the Internet are each at least as high as the summed downstream and upstream bandwidths of the macro connections of the gateway devices using said relay machine as their proxy.

10. The system of claim 1, wherein the relay machines log the Internet traffic they relay.

11. The system of claim 1, wherein the relay machines are physical machines.

12. The system of claim 1, wherein the coordination machine is a physical machine.

13. The system of claim 1, wherein the functions of the coordination machine are distributed onto at least two machines.

14. The system of claim 1, wherein the functions of the coordination machine are implemented as a peer-to-peer, decentralized, and/or distributed computer program.

15. A method for demand-driven, flexible-topology and intelligently-enabled communication between one or more network-enabled client devices and one or more network-enabled application servers over multiple segments of the Internet concurrently; where said communication transits through multiple networking equipment including gateway devices and relay machines; where said relay machines are assigned to said gateway devices by a coordination machine; the method comprising the steps of:
    making network requests directed at at least one of the application servers, using the client devices;
    intercepting the network requests, modifying them to support connection-selection and network data transmission, reception, buffering, validation, and synchronization facilities referred to as a connection-merging protocol, and transmitting the modified network requests for proxying to at least one of the relay machines over at least two Internet connections per gateway device, using the gateway devices;
    synchronizing and reassembling the modified network requests received over the Internet connections, recreating the original network requests, and transmitting the original network requests to the application servers, using the relay machines;
    receiving the network requests and transmitting network responses back to the relay machines, using the application servers;
    receiving the network responses from the application servers, modifying them to support the connection-merging protocol, and transmitting modified network responses to the gateway devices over the Internet connections, using the relay machines;
    synchronizing and reassembling the modified network responses received over the Internet connections, recreating the original network responses, and transmitting the original network responses to the client devices, using the gateway devices; and
    receiving the network responses, using the client devices.

16. The method of claim 15, wherein the client devices explicitly proxy their traffic through the relay machines.

17. The method of claim 15, wherein the network requests to the application servers originate from the gateway devices, and the network responses from said application servers are intended for said gateway devices.

18. The method of claim 15, further comprising, when the relay machines are under-utilized, the steps of the coordination machine:
    initiating the termination of at least one of the relay machines, being referred to as to-be-terminated relay machines;

ensuring that the gateway devices are instructed to "migrate" away from the to-be-terminated relay machines; and shutting down the to-be-terminated relay machines once the gateway devices have ceased using the to-be-terminated relay machines as proxies.

19. The method of claim 15, further comprising, when the relay machines become over-utilized, the steps of the coordination machine:

launching at least one new relay machine, being referred to as the newly-launched relay machines; and instructing a subset of the gateway devices to migrate to the newly-launched relay machines.

20. The method of claim 15, wherein the coordination machine dynamically scales the performance specifications of the relay machines.

21. The method of claim 15, further comprising the steps of:

querying the coordination machine for which of the relay machines to use as a proxy, using the gateway devices; and instructing the gateway devices as to which of the relay machines to proxy through, using the coordination machine.

22. The method of claim 15, further comprising the steps of the gateway devices:

periodically measuring at least one property of their Internet connections; and terminating and scheduling the relaunch of certain of their Internet connections based on said measurements.

23. The method of claim 15, further comprising the steps of the relay machines:

periodically measuring their network and computational load; and reporting said measurements to the coordination machine.

* * * * *